Feb. 10, 1931.                A. J. HANTSCHEL ET AL                1,791,593
                          AUTOMATIC GEAR SHIFTING MECHANISM
                              Filed May 4, 1927          5 Sheets-Sheet 1

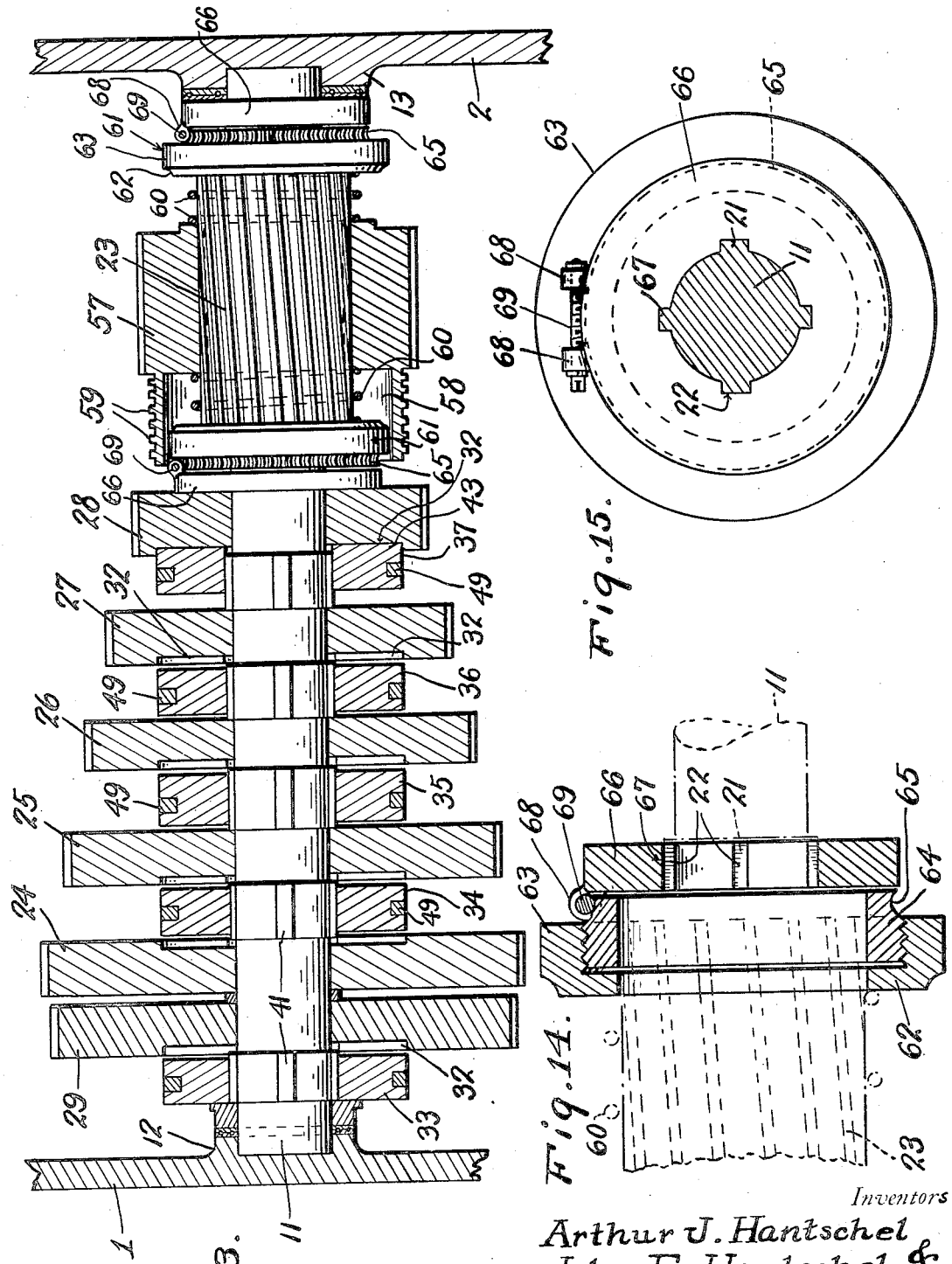

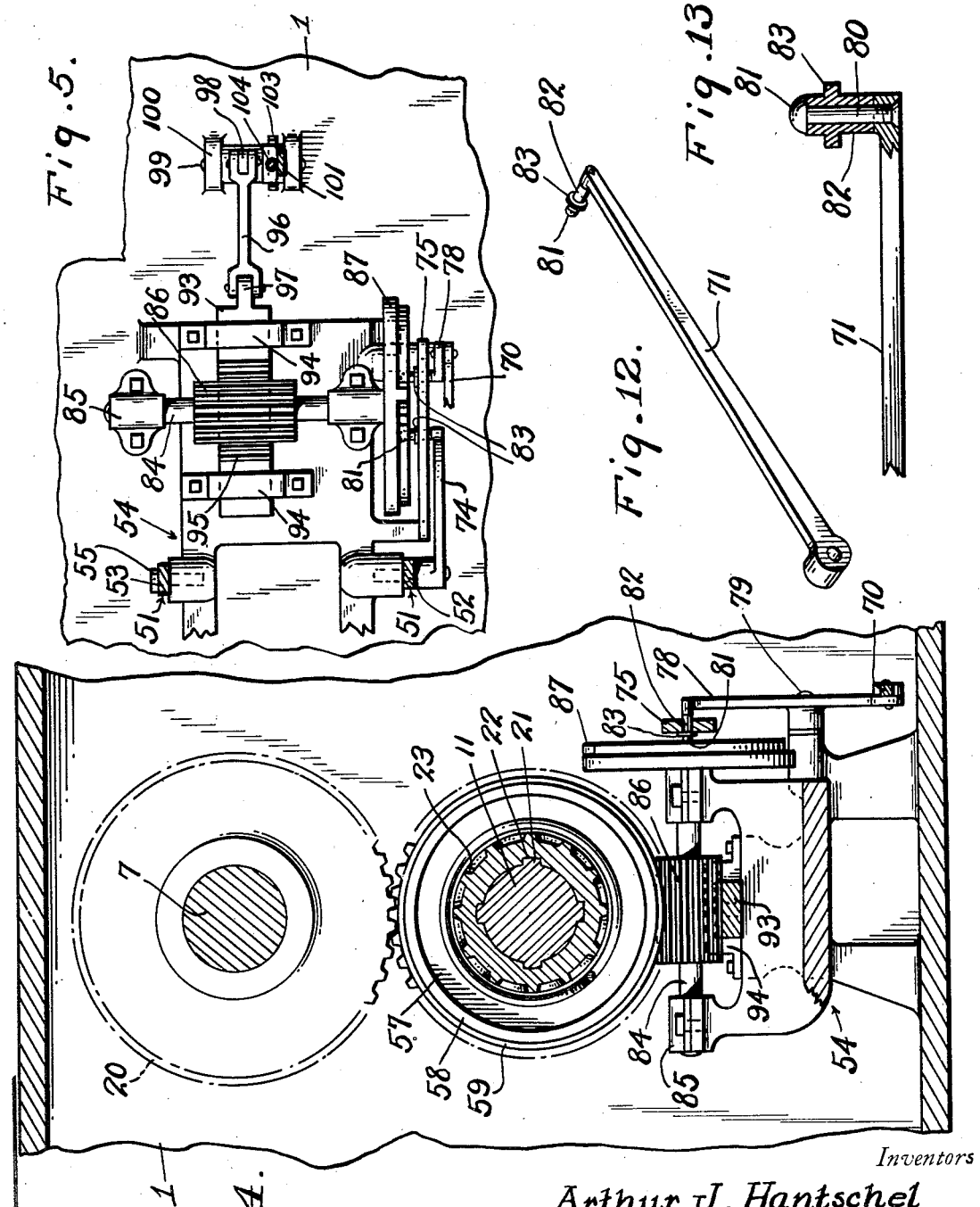

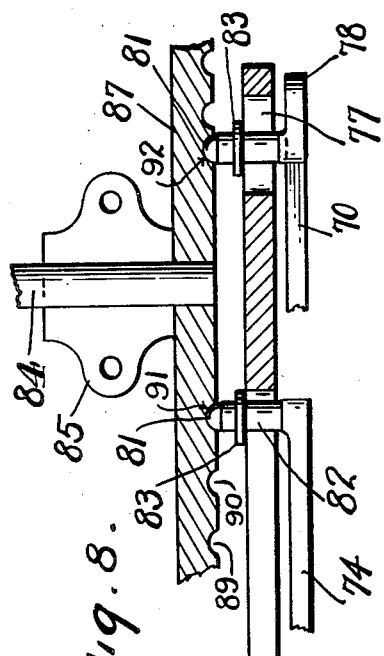
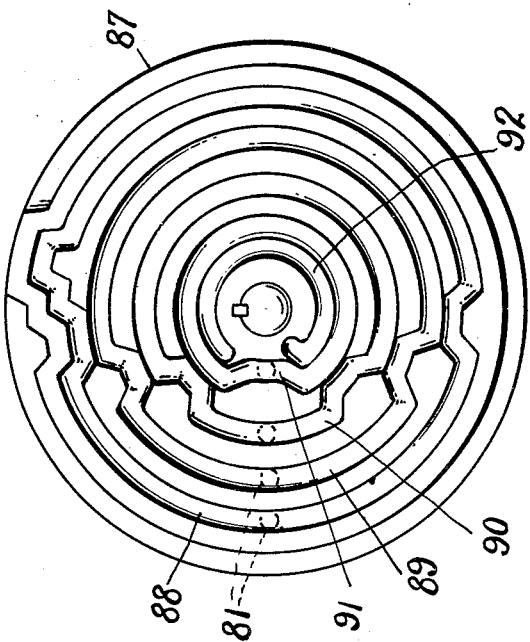
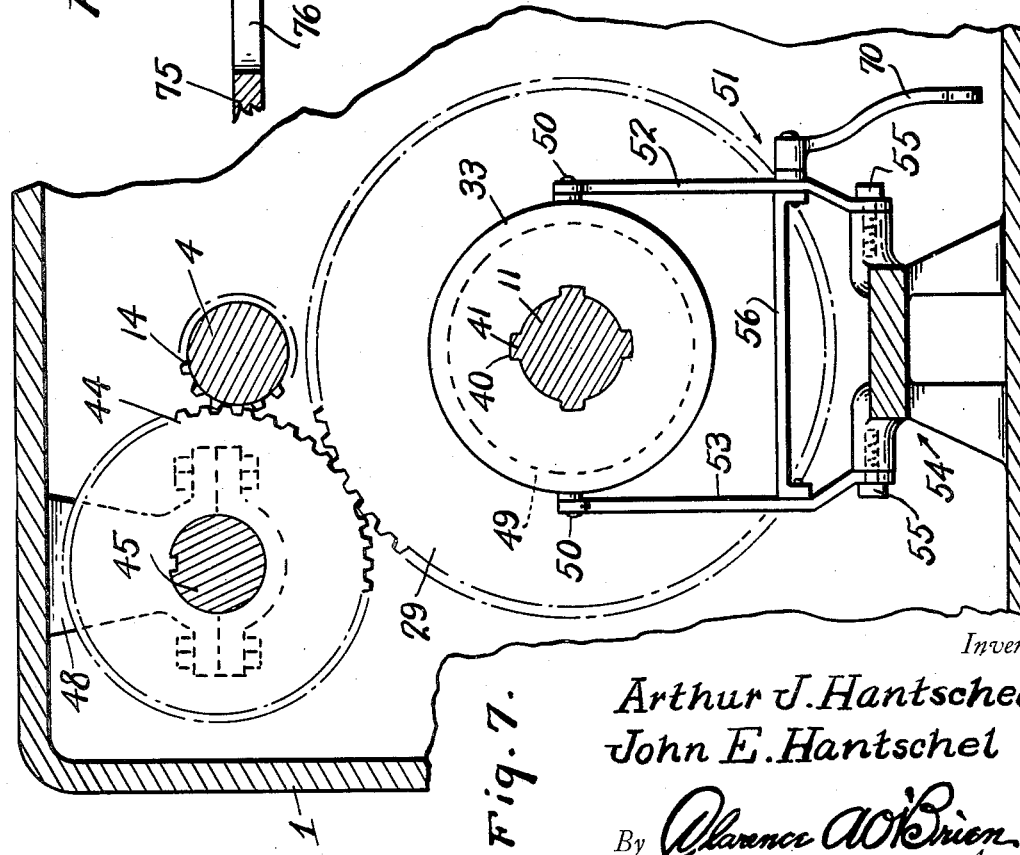
Inventors
Arthur J. Hantschel &
John E. Hantschel
By Clarence A. O'Brien
Attorney Patented Feb. 10, 1931

1,791,593

UNITED STATES PATENT OFFICE

ARTHUR J. HANTSCHEL AND JOHN E. HANTSCHEL, OF APPLETON, WISCONSIN

AUTOMATIC GEAR-SHIFTING MECHANISM

Application filed May 4, 1927. Serial No. 188,723.

The present invention relates to improvements in gear shifting mechanisms and has for its principal object to provide means for automatically shifting the gears for the purpose of translating resistance into mechanical action to reduce the load placed on the driving force.

One of the important objects of the present invention is to provide an automatic gear shifting mechanism which includes a means for permitting the shifting mechanism to be actuated manually as well as automatically.

A still further object is to provide a gear shifting mechanism of the above mentioned character which will at all times be positive and efficient in its operation, the parts comprising the mechanism being so arranged as to enable the same to be readily accessible whenever necessary.

A further object is to provide the clutch control yoke members with actuating levers, the latter being operatively associated with a cam wheel which in turn is operated when the load placed on the driving force becomes excessive, said cam wheel and the levers actuated thereby tending to translate the resistance into mechanical action to reduce the load placed on the driving force in a positive and efficient manner.

A still further object is to provide an automatic gear shifting mechanism of the above mentioned character which is simple in construction, inexpensive, strong and durable and further well adapted to the purpose for which it is designed.

Other objects and advantages of the invention will become apparent during the course of the following description taken in connection with the accompanying drawings.

In the accompanying drawings forming part of this application:—

Figure 3 is a side elevation of the counter shaft showing the idling gears arranged thereon and the slidable coacting clutches which are splined on the shaft, and showing the oblique toothed gear secured on the rear end portion of the counter shaft with the slidable gear arranged thereon.

Figure 4 is a vertical sectional view through the transmission housing and through the driven and counter shaft for more clearly disclosing the actuating means for the cam wheel.

Figure 5 is a top plan view of the cam wheel actuating means and also showing in top plan the manually operable rack bar.

Figure 6 is a front face elevation of the cam wheel.

Figure 7 is a vertical sectional view through the forward end of the transmission housing showing the gearing for effecting the reverse movement of the driven shaft, and for also clearly disclosing one of the yoke members for actuating its respective clutch.

Figure 8 is an enlarged detail showing the manner in which the rear ends of the clutch yoke operating levers cooperate with the cam grooves in the cam wheel, and showing the guide bar in which the inner end portions of the levers are slidable.

Figure 9 is an elevational view of one of the idling gears showing the wing shaped recesses formed in one face thereof.

Figure 10 is a similar view of one of the clutches adapted for cooperation with the idling gears, and showing the wing shaped shoulders formed on one face thereof, the laterally projecting pins carried by the collar which encircles each clutch being also shown.

Figure 11 is a detail perspective view of the rack bar.

Figure 12 is a detail perspective view of one of the clutch yoke actuating levers.

Figure 13 is a detail of the inner end portion of one of said levers showing the headed pin extending laterally therefrom, and the sleeve which encircles the upper end portion of the pin.

Figure 14 is a vertical sectional view of one of the spring tension adjusting members associated with the oblique toothed member or spiral secured on the rear end of the counter shaft.

Figure 15 is a sectional view through the rear end portion of the counter shaft showing the ring secured thereon and the screw carried by the ring which is adapted to cooperate with the worm forming a part of the spring tension adjusting means.

Figure 16 is a detail of the gear shifting lever showing the pawl in a raised inoperative position, and Figure 17 is a sectional view taken approximately on the line 17—17 of Figure 16, looking in the direction of the arrows.

Figure 1:
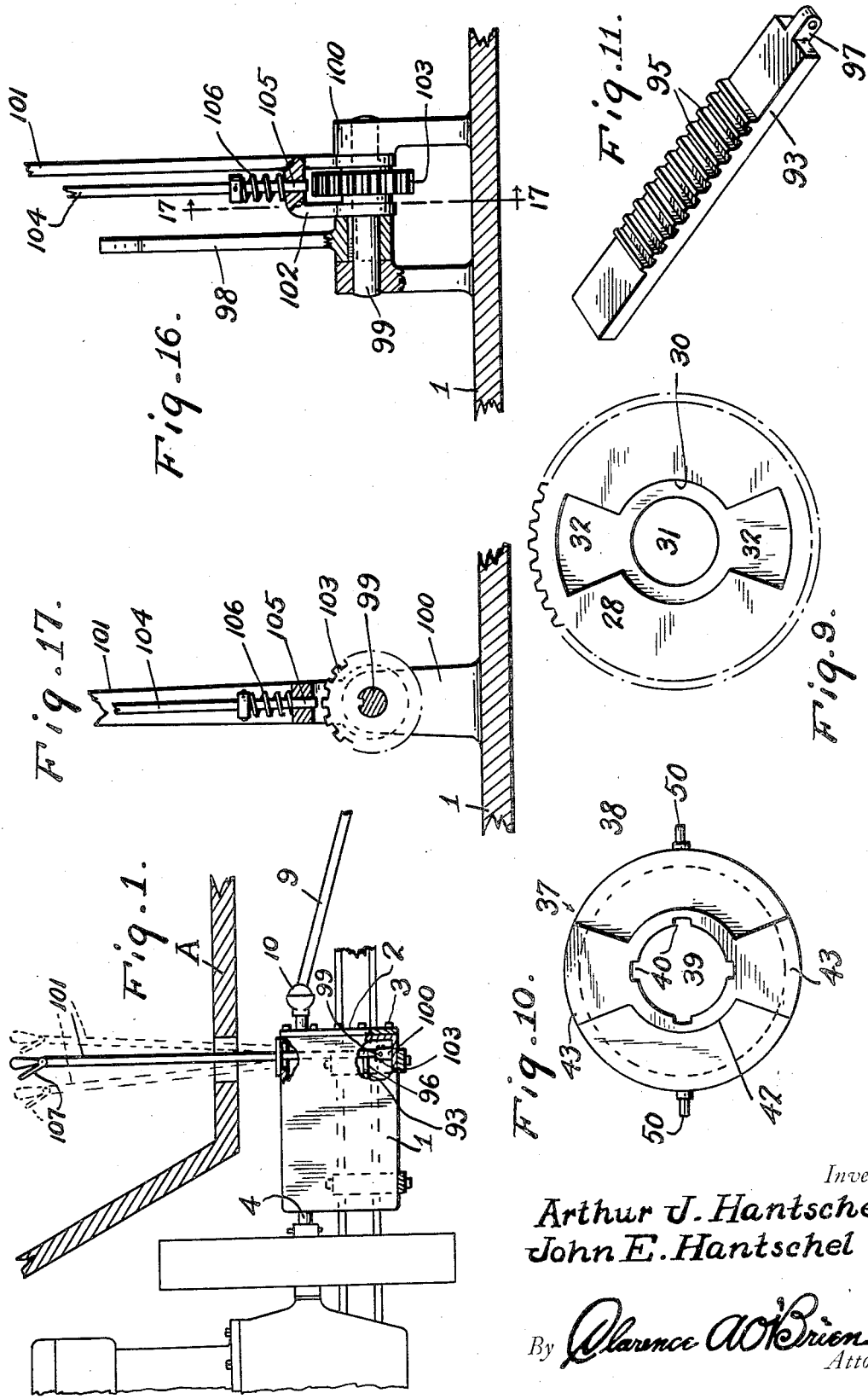
Figure 1 is a detail side elevation of a portion of a transmission mechanism associated with an automobile, and showing the gear shifting lever extending upwardly therefrom through the floor board of the vehicle.

In the drawings wherein for the purpose of illustration is shown the preferred embodiment of our invention, the numeral 1 designates the transmission housing, the same being open at its rear end. A removable cover 2 is provided for the open rear end of the housing and the securing means for the cover is shown generally at 3. Extending longitudinally through the forward end of the housing 1 is the motor or drive shaft 4, the rear end of this shaft being disposed within the housing 1 and journaled in a suitable bearing 5 which is suspended from the top of the housing in the manner clearly disclosed in Figure 2 of the drawings. A bearing 6 is formed on the inner side of the forward end of the housing for supporting the intermediate portion of the drive shaft 4.

Arranged in alinement with the drive shaft 4 is the driven shaft 7, the same extending through the cover 2 provided for the open rear end of the housing 1. The forward end of this driven shaft is disposed within the housing 1 and is journaled for rotation in the bearing 5 and is arranged in opposed relation with respect to the inner or rear end of the drive shaft 4 and this is clearly shown in Figure 2. A bearing 8 is provided for the intermediate portion of the driven shaft 7 on the inner side face of the cover 2. The outer end of this driven shaft 7 is operatively connected to the propeller shaft 9 by the universal joint 10 in the manner well known in the art, and as this forms no important part of the present invention a further detailed discussion thereof is not thought necessary.

Disposed within the transmission housing 1 below the alined drive and driven shafts 4 and 7, respectively, is the counter shaft 11. The ends of this shaft are journaled in suitable bearings 12 and 13 provided therefor on the inner faces of the forward and rear ends of the transmission housing the manner in which the respective ends of the countershafts are journaled in these bearings is clearly shown in Figure 2. The counter shaft 11 is arranged in vertical alinement with the drive shaft 4 and the driven shaft 7 as is clearly illustrated in Figures 4 and 7 of the drawings. An elongated gear 14 is arranged on the drive shaft 4, and is disposed adjacent the inner side of the forward end 1 of the transmission housing. A gear unit designated generally by the numeral 15 is secured on the rear end portion of the drive shaft 4 for rotation therewith and the same includes the spaced gears 16, 17, 18 and 19 respectively. These gears gradually increase in size toward the rear end of the drive shaft 4 and the teeth of each of these gears is disposed at an oblique angle. The teeth of the gear 14 are also arranged obliquely. An obliquely toothed gear 20 is keyed or otherwise fixedly secured on the inner end of the driven shaft 7.

The rear end portion of the counter shaft 11 is formed with the annular spaced longitudinally extending ribs or keys 21 for engagement within the longitudinally extending slots or grooves 22 provided in the inner peripheral face of the elongated spiral member 23 whereby said spiral member will be secured on the rear end portion of the counter shaft for rotation therewith. The teeth of this elongated spiral member 23 are also disposed at an oblique angle, and this is clearly illustrated in Figure 3 of the drawings. The purpose of this spiral member 23 will be hereinafter more fully described.

Five forward speed gears are idly arranged on the shaft 11 forwardly of the elongated spiral member 23 and these gears are designated by the numerals 24, 25, 26, 27 and 28, respectively. These gears gradually decrease in size from the forwardmost gear 24 to the rearwardmost one as is more clearly illustrated in Figures 2 and 3 of the drawings. A reversing gear 29 is idly mounted on the forward end portion of the counter shaft 11 forwardly of the gear 24.

Each of the idly mounted gears arranged on the counter shaft 11 is formed with an annular groove 30 in one face thereof around the bore 31 and communicating with this groove are the diametrically opposed wing shaped recesses 32 which are also formed in the face of each gear mounted on the counter shaft, and this construction is clearly disclosed in Figure 9 of the drawings.

Splined on the counter shaft 11 are the slidable clutches 33, 34, 35, 36, and 37, respectively. Each of the aforementioned clutches comprises a disc 38 which is formed with a central opening 39 to accommodate the counter shaft 11 and a series of annular spaced slots such as are shown at 40 are formed in the inner peripheral face of each disc for engagement with the longitudinally extending ribs or keys 41 formed on the forward portion of the counter shaft 11 at spaced intervals whereby the clutches will be adapted for simultaneous operation with the counter shaft 11.

Each disc 38 is furthermore formed with an annular shoulder 42 on one face thereof around the bore or opening 39 and also formed on the face of the disc on which the annular shoulder is provided are the diametrically opposed wing shaped projections 43 as is more clearly disclosed in Figure 10. Each of the clutches with the exception of the clutch 34 is formed on one face thereof with this shoulder and wing shaped projection. The clutch 34 however is formed on both of its faces with such an arrangement whereby said clutch may be employed for locking either the gear 24 or the gear 25 to the counter shaft 11.

The annular shoulders 42 and the wing shaped projections 43 are adapted to fit into the annular grooves 30 and the wing shaped recesses 32 of the respective idling gears which are mounted on the counter shaft 11 whereby the forward speed idling gears or the reversing gear may be selectively locked for rotation with the counter shaft in the manner to be presently described. The gears 24, 25, 26, 27 and 28 mesh with the gears 14, 16, 17, 18 and 19, respectively, and the teeth of the idling gears mounted on the counter shaft are obliquely arranged in the same manner as the obliquely arranged teeth of the gears carried by the drive shaft 4. These intermeshing gears provide an operative connection between the drive shaft 4 and the counter shaft 11 and when the idling gears are selectively secured or locked for rotation with the counter shaft, a positive driving connection between the drive shaft 4 and the counter shaft 11 will be provided.

The relatively large reversing gear 29 meshes with a smaller reversing gear or pinion 44 which is keyed on a stub-shaft 45, the latter being journaled at its forward end in a suitable bearing 46 provided therefor in the inner side of the forward end of the transmission housing 1 on one side of the drive shaft 4. The outer end of the stub shaft 45 is journaled in a suitable bearing 47 which is suspended from the top of the forward portion of the transmission housing as illustrated at 48 with reference more particularly to Figures 2 and 7 of the drawings. The disc 38 of each of the clutches is formed with an annular groove in its outer edge portion and seated in this groove is the ring 49. A pair of pintles 50 project from the ring 49 at diametrically opposite points and the outer ends of the pintles are reduced as is more clearly disclosed in Figure 10.

Figure 2:
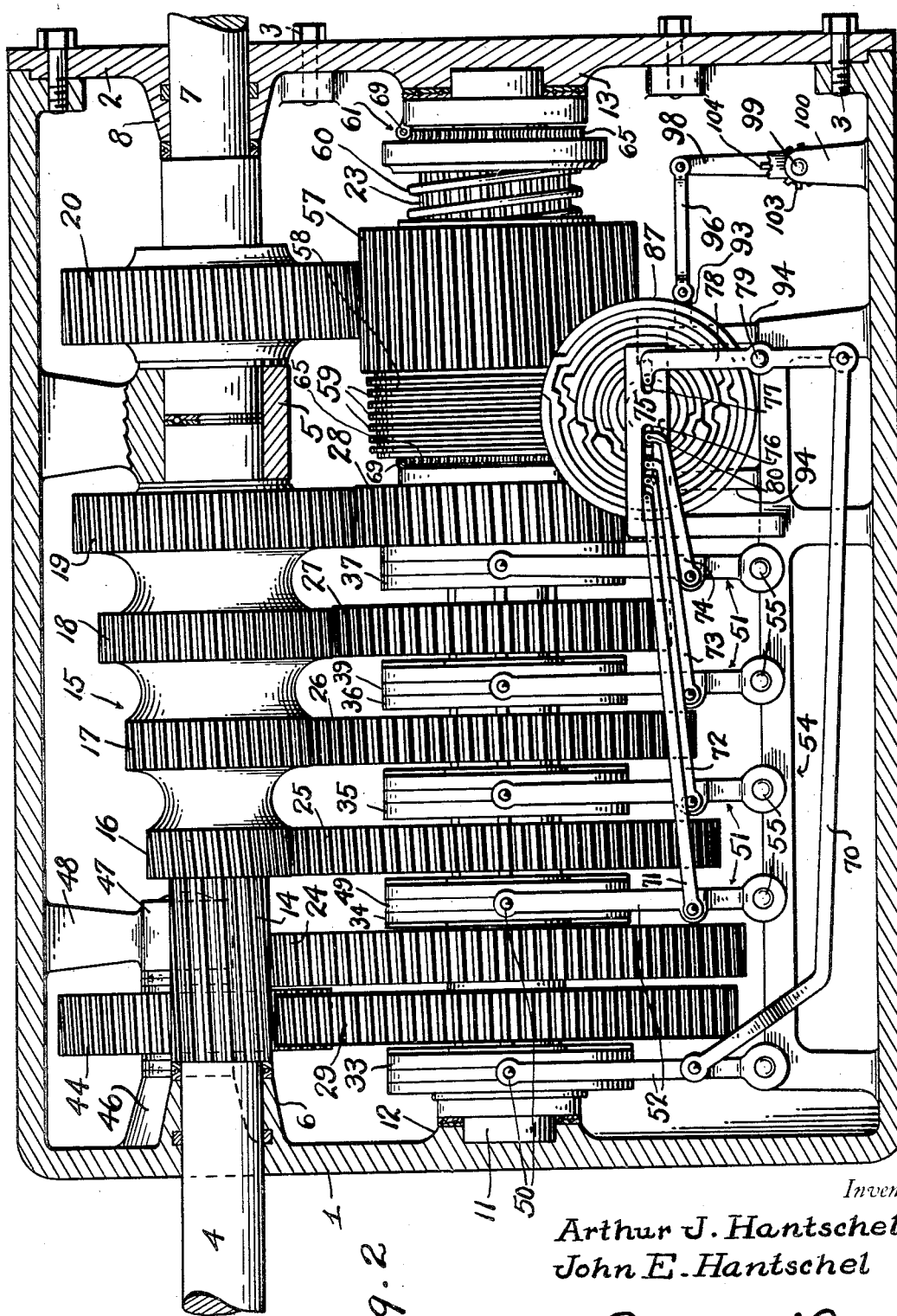
Figure 2 is an enlarged longitudinal sectional view through the transmission housing showing the gearing arranged therein, the drive shaft being connected to the driven shaft in high speed.

Adapted for cooperation with each of the slidable clutch members is the yoke designated generally by the yoke 51 the same comprising a pair of vertically disposed arms 52 and 53 respectively which are pivotally secured at their lower ends on the opposite sides of an elongated stand 54 which is disposed longitudinally within the housing 1 and is supported on the bottom thereof in the manner clearly shown in Figure 2. The pivotal connection between the lower ends of the vertically disposed arms and the stand is indicated at 55. A cross bar 56 connects the arms 52 and 53 together in the manner as clearly shown in Figure 7. The upper ends of these arms are formed with suitable eyes for receiving the reduced ends of the respective pintles 50 and this is also clearly illustrated in Figure 7 of the drawings. Five of these yokes are pivotally supported on the stand 54 and these yokes cooperate with the pintle carrying rings which are disposed within the annular grooves formed in the outer peripheral edges of the clutches for moving the latter into locking engagement with the respective idling gears selectively and the operating means for the yoke members will also be presently described.

Also forming a very important part of the present invention is the gear 57. The bore of this gear is formed with obliquely arranged teeth formed on the spiral member 23 which is secured for rotation with the rear end of the counter shaft 11. The gear 57 is formed with similar shaped teeth in its outer peripheral face for meshing engagement with the obliquely toothed gear 20 which is keyed on the driven shaft 7. This gear 57 is slightly wider than the gear 20 but is of less width than the elongated spiral member 23 and the gear 57 is adapted for slidable movement along the elongated spiral member 23 for a purpose to be hereinafter more fully described.

Formed on the front face of this gear 57 is the relatively wide collar 58. A series of spaced circumferentially extending teeth 59 are formed in the outer peripheral face of this collar and these teeth are clearly disclosed in Figures 2 and 3 of the drawings.

This collar 58 is of a relatively large diameter and the outer edge of the collar is spaced from the outer side face of the smallest idling gear 28.

A pair of expansible coil springs such as are shown at 60 are disposed around the elongated spiral member 23 on opposite sides of the slidable gear 57 and for the purpose of adjusting the tension of these springs there is provided the spring tension adjusting members designated generally by the numerals 61. Each of these members comprises a ring 62 which is freely slidable over the spiral member 23. An internally threaded annular flange 63 is formed on the outer side of the ring 62 adjacent its peripheral edge and threaded into this internally threaded annular flange is the collar 64, the latter being formed with a worm gear 65 in the outer peripheral portion thereof.

The spring tension adjusting unit further includes the provision of a ring 66 which is disposed adjacent the outer face of the collar 64 and this ring 66 is formed with a transverse slot 67 in its inner periphery for receiving the lower end portions of the longitudinally extending ribs 21 formed on the rear end portion of the counter shaft 11.

This is clearly disclosed in Figure 15 of the drawings.

A pair of spaced ears as are shown at 68 are formed on the upper portion of each of the rings 66 and these ears are formed with registering apertures through which extends the worm or screw 69. The ears 68 extend beyond the inner face of the ring 66 so that the worm or screw 69 can operatively engage the worm gear 65 of the collar 64 whereby when the outer end of the worm 69 is rotated the worm will in turn cooperate with the worm gear 65 to adjust the collar 64 with respect to the flanged ring 62 whereby the latter will be actuated to regulate the tension of the respective coil springs 60.

The coil springs are so arranged as to normally maintain the gear 57 on the central portion of the elongated spiral member 23.

The clutch shifting yokes are actuated by means of suitable levers. The lever 70 is operatively connected at its forward end to the yoke associated with the clutch 33 and this lever extends rearwardly along the bottom of the housing 1 in the manner clearly shown in Figure 2. A lever 71 is connected at its forward end to the yoke associated with the clutch 34 at a point above the pivotal connection between the yoke and the stand 54 and this lever also extends rearwardly. A similar lever 72 is operatively connected at its forward end to the yoke associated with the clutch 35. A shorter lever 73 is connected at its forward end to the yoke associated with the clutch 36, and a still shorter lever 74 is operatively connected at its forward end to the yoke which shifts the clutch 37. This arrangement or construction is clearly disclosed in Figure 2 of the drawings.

A longitudinally extending bar 75 is supported on the rear end portion of the stand 54 at the forward side thereof, and this bar is formed with an elongated slot 76 in the forward portion thereof and the shorter slot 77 in the rear end portion of the same as is more clearly disclosed in Figures 2 and 8 of the drawings. The purpose of these slots will also be presently described.

An auxiliary lever 78 is pivotally supported intermediate its ends on the forward side of the rear end portion of the stand 54 as at 79, and this auxiliary lever is disposed vertically. The lower end thereof is operatively connected to the rear end of the elongated lever 70.

A pin 80 is secured at one end in the outer rear end of each of the levers 71, 72, 73 and 74, as well as the upper end of the auxiliary lever 78, and a head 81 is formed on the outer end of each of these laterally disposed pins in the manner clearly shown in Figure 13.

Encircling each of the headed pins 80 is a sleeve 82, the same being adapted for slidable movement within the slotted guide bar 75, and a flange 83 is formed on the sleeve 82 adjacent its outer end for disposition against the inner side of the slotted guide bar for the purpose of preventing the displacement of the headed pins from the slotted guide bar. The headed pins which extend laterally from the rear ends of the levers 71, 72, 73, and 74, extend through the forward slot 76 formed in the guide bar 75, while the headed pin carried by the upper end of the auxiliary lever 78 which is operatively associated with the rear end of the elongated lever 70 is disposed for movement within the rear slot 77, and this is clearly illustrated in Figures 2 and 8 of the drawings.

Arranged transversely beneath the circumferentially toothed collar 58 and the counter shaft 11 is the shaft 84, the same being journaled in suitable bearings shown at 85 with reference more particularly to Figures 4 and 5 of the drawings, and which bearings are associated with the rear end portion of the stand 54. An elongated spur gear 86 is secured on the intermediate portion of this shaft 84 for rotation therewith and the circumferentially extending teeth or ribs 59 formed on the outer peripheral face of the collar 58 engage the teeth of the spur gear in the manner shown also in Figure 4.

An enlarged cam wheel 87 in keyed on the outer end of this shaft 84 and disposed in spaced relation with respect to the inner face of the guide bar 75 as is clearly disclosed in Figures 4 and 8. The front face of this cam wheel 87 is formed with the cam grooves 88, 89, 90, 91 and 92, respectively, as is more clearly disclosed in Figure 6 of the drawings. The headed ends 81 of the pins carried by the rear ends of the clutch actuating levers are operable within the respective cam grooves as shown very clearly in Figure 8, and the manner in which the headed pins cooperate with the cam grooves in the cam wheel 87 will also be hereinafter more fully described.

The operation of the automatic gear shifting mechanism as thus far described may be briefly stated as follows:

The mechanism is shown in the present instance with the drive shaft 4 connected to the driven shaft 7 in high speed and this is obtained by disengaging the clutches 33, 34, 35, and 36, respectively from their respective gears and maintaining the clutch 37 into locked engagement with the gear 28 and the drive will be through the drive shaft 4, the intermeshing gears 19 and 28 through the counter shaft 11 and through the intermeshing gears 57 and 20 to the driven shaft 7. The engine is now geared in high speed and as the driven shaft 7 and the gear 20 keyed thereon offers increasing resistance to the propulsion of the vehicle, the resistance is translated into mechanical action through the movement of the slidable gear 57 along the elongated spiral member 23 in a direction toward the front of the vehicle or rather in a left hand direction, and this gear 57 moves forwardly against the tension of the left hand coil spring 60, the circumferentially ribbed or toothed collar 58 which is in engagement with the spur gear 86 will cooperate with the spur gear to impart a rotary movement to the shaft 84, thereby effecting the rotation of the cam wheel 87 in a counter clockwise direction and as this cam wheel moves in a counter clock-wise direction, the headed pin which is carried by the rear end of the lever 74 will move out of the innermost portion of this groove 91 whereby to effect a forward sliding movement of the lever 74, and as this lever is operatively connected to the yoke which is associated with the clutch 37, the latter will be moved outwardly along the counter shaft 11 out of engagement with the gear 28.

Simultaneously with the disengagement of the clutch 37 from the gear 28, the next adjacent clutch 36 will be brought into locking engagement with the gear 27 and this is accomplished by reason of the fact that the headed pin carried by the rear end of the lever 73 will have moved into the innermost portion of the cam groove 90 during the counter-clockwise rotation of the cam wheel 87. The drive will then be through the drive shaft 4, the intermeshing gears 18 and 27 through the counter shaft 11, through the intermeshing gears 20 and 57 and finally through the driven shaft 7. This will cause the counter shaft to operate at a slightly lower rate of speed.

As the resistance or load increases, the cam wheel 87 will continue to rotate in a counter-clockwise direction and the headed pin carried by the rear end of the lever 73 will move out of the innermost portion of its cam groove 90 whereby the clutch 36 will be disengaged from the gear 27 to permit the gear 27 to idle on the counter shaft. As the headed end of the pin carried by the inner end of this lever 73 moves into the major portion of its cam groove, the headed pin carried by the inner end of the next adjacent lever 72 will move into its innermost portion of the cam groove 89 to lock the gear 26 on the counter shaft 11. This will permit the counter shaft to operate at a still lower rate of speed to compensate for the resistance or load.

The levers 71 and 72 are adapted to be actuated in the same manner as the levers 73 and 74 depending upon the resistance or load placed upon the drive shaft, and this mechanism will compensate for such load in a positive and efficient manner. As soon as the load is reduced, the driving force will again be able to propel the driven shaft 7 at a more economical gear ratio and gradually the speed will be increased until the high speed gears 19 and 28 are in operation.

The shifting mechanism thus far described is entirely automatic in its operation and we have further provided a means whereby the shifting mechanism may be manually operated, and to this end there is provided a sliding rack bar 93 which is disposed transversely beneath the shaft 84 and is operable within suitable guides 94 provided therefor in the manner as is more clearly illustrated in Figure 5 of the drawings.

The teeth 95 are adapted to engage the spur gear 86 secured on the shaft 84, and this rack bar is adapted for slidable movement beneath the shaft 84 through the medium of the link 96 which is operatively connected at its forward end to an apertured lug 97 which projects from the rear end of the slidable rack bar 93. The other end of this link 96 is operatively connected to the upper end of a vertically disposed arm 98 which in turn is secured at its lower end on a suitable stub shaft 99 which has its ends supported in a pair of spaced standards 100 which extend upwardly from the bottom portion of the housing 1 adjacent the open rear end thereof. It is of course to be understood that the lower end of the vertically disposed arm 98 is formed with a sleeve to permit the same to be mounted on the stub shaft 99, and this sleeve is keyed on the shaft in the manner as is clearly illustrated in Figure 16 of the drawings.

For the purpose of actuating the shaft 99 there is provided the elongated hand lever 101 which is formed at its lower end with an eye portion through which the shaft 99 extends and this lever 101 extends upwardly through a suitable opening provided therefor in the top of the transmission housing and through the floor board A of the vehicle so that the upper end of this hand lever is within easy access of the operator of the vehicle.

A yoke portion 102 is associated with the lower end of this hand lever 101 and this yoke portion is arranged on the stub shaft 99 in the manner clearly shown in Figure 16 whereby to be disposed adjacent the ratchet wheel 103 which is keyed on the intermediate portion of the stub shaft 99. A rod 104 is disposed vertically adjacent the hand lever 101 and the lower end of this rod extends through a suitable opening provided therefor in the yoke 102 and terminates in a pawl 105 which is normally held out of engagement with the ratchet wheel 103 through the medium of the expansible coil spring 106. A suitable hand lever 107 is pivotally secured on the upper end portion of the lever 101 and this lever 107 is operatively associated with the upper end of the rod 104 for actuating the same to move the pawl 105 into engagement with the ratchet wheel 103 and when the parts are thus arranged, and the lever 101 is actuated the rack bar 93 will reciprocate depending upon the direction in which the hand lever 101 is swung, and when the rack bar 93 moves in one direction, the teeth 95 thereof will cooperate with the teeth of the spur gear 86 to effect the rotation of the cam wheel 87 whereby to move the clutch 34 to the left into locking engagement with the gear 24 so that the counter shaft will be driven at its lowest speed and which may be termed as the starting speed. The provision of the gear 24 will provide a means whereby the jarring or rocking movement incident to the initial shifting of the gears on an automobile will be eliminated.

By moving the rack bar 93 in one direction, the same will impart rotary movement to the shaft 84 whereby to move the cam wheel 87 in a counter-clockwise direction and when the cam wheel 87 moves in this direction, the headed pin carried by the upper end of the auxiliary lever 78 which is operatively connected to the rear end of the lever 70 will cooperate with its cam groove 92 whereby to move the clutch 33 into locking engagement with the gear 29 so that said gear will be operatively secured on the counter shaft for rotation therewith and the reversing gears 44 and 29 will permit the driven shaft 7 to be rotated in the reverse direction for obvious reasons. Thus it will be necessary to go from low through intermediate, high, intermediate and low again in passing to reverse. A continuous groove for reverse speed is not necessary because the groove does not turn all of the way around but merely turns three-quarters of the distance. The low speed groove extends outwardly beyond the average circumference of the groove, and the double groove is necessary because one of the clutches operates two gears, namely slow gear and next to slow.

The cam wheel 87 is designed for rotation in both clockwise and counter clockwise directions for the following reasons. Clockwise rotation is provided for efficient positive automatic control of an automobile on steep and long down grades, and to eliminate excessive wear on braking mechanisms. It will prevent skidding when an automobile is very rapidly decelerated on slippery highways, by shifting the gears to lower speed ratios, thus avoiding the danger of locked wheels, and it will practically avoid the danger of stalled motors. It becomes thus a greatly desired safety device. Counter-clockwise rotation of the cam wheel beyond the normal or high speed position takes place only when an unusual strain or load is placed on the transmission by the driving force, such as excessive application of the wheel brakes in the instant before the motor has normally decelerated its speed. This action prevents the car wheels from stopping entirely through excessive braking action.

Counterclockwise rotation of the cam wheel 87 is the usual mechanical action which results from increasing strain or load on the transmission from the driven members, and this action is either automatic in its sequences, or is manually controlled at will of the driver or machine operator. Thus it becomes the primary action in control of the machine's efficiency.

The normal operating position of the cam wheel is high speed. Under manual control the cam wheel can be rotated counterclockwise to obtain any desired gear ratio speed including reverse. Reverse speed is the position on the cam wheel at the extreme counter clockwise rotation of said cam wheel. There is a gap between the notches in the circumferences of the grooves 88 and 92 amounting to approximately thirty degrees or one-twelfth of the circumference of the cam wheel represents the neutral position between low and reverse speeds. This gap is designed to prevent possibility of automatically moving the transmission from low to reverse when the resistance to movement of the vehicle becomes excessive. Likewise it prevents the driver from throwing the gears into reverse accidentally by providing a longer movement of the hand lever from the low position to reverse than for any other of the forward speed positions.

When the rack bar 93 moves its maximum distance in the first direction referred to, that is to the right, as viewed in Figure 5, it will pass into the reverse position. If the rack bar 93 is then moved in the other direction or to the left as viewed in Figure 5, the cam wheel 87 moves in a clockwise direction and the speed gears ratios are altered successively away from reverse, through neutral, low, intermediate, and high speed, the latter being the normal operating speed. Reverse cannot be reached by clockwise rotation of the cam wheel, nor can reverse be reached automatically.

The expansible springs 60 are designed to hold the slidable gear 57 in a central position on the spiral member 23 until forced to give way according as the strain from the driven member increases by degrees. When the strain on the sliding gear 57 is relaxed, the springs cooperate to return the slidable gear to its normal position. Now let us assume that a sudden excessive strain causes the sliding gear to act against the forward spring sufficiently to shift the gears into and through low speed. After passing through low, the strain on the sliding gear has completely relaxed due to the break in the power transmission since the machine is now in the neutral zone of thirty degrees between low and reverse. Expansible springs 60 cooperate instantly to center the sliding gear 57 in its normal position, but in doing so, the power is again coupled, as the gears are shifted back through low, intermediate and high.

It will thus be seen from the foregoing description that we have provided a gear shifting mechanism that can be automatically or manually operated, and due to its simplicity the coacting elements will at all times be positive and efficient in their operation, and when a vehicle is descending a steep grade, the gear ratio can be readily changed to permit the vehicle to travel at a safe speed while descending a steep grade and manifestly when the vehicle is ascending a hill, the gear ratio will compensate for the strain or load placed upon the driving force and this can be accomplished either automatically or manually as may be desired.

In starting a vehicle, the power being applied at the drive shaft the gear 57 is slidably operated or moved toward the left as torque develops. This causes the combination of action resulting in changing the gear ratio downwardly. As the torque lessens with increase of power and vehicle speed, the gear ratio is brought back to the normal or high speed position.

While we have shown the preferred embodiment of our invention, it is to be understood that various changes in the size, shape and arrangement of parts may be resorted to without departing from the spirit of the invention and the scope of the appended claims.

Having thus described the invention, what we claim as new and desire to secure by Letters Patent is:—

1. In combination, a drive shaft, a driven shaft, a counter shaft, speed changing gears arranged on the drive shaft for rotation therewith, idling gears on the counter shaft meshing with the respective gears on the drive shaft, clutches splined on the counter shaft and adapted for slidable movement thereon for selectively locking the idling gears on the counter shaft for rotation therewith, a yoke operatively associated with each clutch, levers operatively connected at their forward ends to the respective yokes for actuating the same, an operating mechanism for the rear ends of the levers, and load responsive means for association with the driven shaft and the counter shaft to actuate the operating mechanism automatically depending upon the load placed on the driven shaft.

2. In combination, a drive shaft, a driven shaft, a counter shaft, speed changing gears arranged on the drive shaft for rotation therewith, idling gears on the counter shaft meshing with the respective gears on the drive shaft, clutches splined on the counter shaft and adapted for slidable movement thereon for selectively locking the idling gears on the counter shaft for rotation therewith, a yoke operatively associated with each clutch, levers operatively connected at their forward ends to the respective yokes for actuating the same, an operating mechanism for the rear ends of the levers, and load responsive means for association with the driven shaft and the counter shaft to actuate the operating mechanism automatically depending upon the load placed on the driven shaft, said last mentioned means including a gear secured on the driven shaft for rotation therewith, a spiral member arranged on the countershaft for rotation therewith, a gear slidably mounted on the spiral member adapted to rotate therewith and meshing with the gear on the driven shaft, and cooperating means between the slidable gear and said operating mechanism for operating the latter.

3. In combination, a drive shaft, a driven shaft, a counter shaft, speed changing gears arranged on the drive shaft for rotation therewith, idling gears on the counter shaft meshing with the respective gears on the drive shaft, clutches splined on the counter shaft and adapted for slidable movement thereon for selectively locking the idling gears on the counter shaft for rotation therewith, a yoke operatively associated with each clutch, levers operatively connected at their forward ends to the respective yokes for actuating the same, an operating mechanism for the rear ends of the levers, a spiral member arranged on the countershaft for rotation therewith, and load responsive means for association with the driven shaft and the spiral member to actuate the operating mechanism automatically depending upon the load placed on the driven shaft, said last mentioned means including a gear secured on the driven shaft for rotation therewith, a spiral member arranged on the countershaft for rotation therewith, a gear slidably mounted on the spiral member adapted to rotate therewith and meshing with the gear on the driven shaft, and cooperating means between the slidable gear and said operating mechanism for operating the latter, said last mentioned means comprising a collar formed on one end of the slidable gear, circumferential ribs arranged on the outer peripheral face of the collar, a shaft arranged transversely beneath the counter shaft, said aforementioned operating mechanism being secured on said shaft, and a spur gear on the transverse shaft with which the circumferential ribs engage.

4. In combination, a drive shaft, a driven shaft, a counter shaft, a series of speed changing gears secured on the drive shaft for rotation therewith, idling gears mounted on the counter shaft and meshing with respective gears on the drive shaft, slidable clutches splined on the counter shaft for cooperation with the respective idling gears, a yoke operatively associated with each clutch, a series of levers operatively connected at their forward ends with the respective yokes, a rotatable cam wheel, cooperating means between the rear ends of the levers and said cam wheel for selectively actuating the clutches to selectively lock the idling gears on the counter shaft, and load responsive means associated with the driven shaft and the counter shaft for actuating the cam wheel depending upon the load placed on the driven shaft.

5. In combination, a drive shaft, a driven shaft, a counter shaft, a series of speed changing gears secured on the drive shaft for rotation therewith, idling gears mounted on the counter shaft and meshing with respective gears on the drive shaft, slidable clutches splined on the counter shaft for cooperation with the respective idling gears, a yoke operatively associated with each clutch, a series of levers operatively connected at their forward ends with the respective yokes, a rotatable cam wheel, cooperating means between the rear ends of the levers and said cam wheel for selectively actuating the clutches to selectively lock the idling gears on the counter shaft, and load responsive means associated with the driven shaft and the counter shaft for actuating the cam wheel depending upon the load placed on the driven shaft, said last mentioned means including a gear secured on the driven shaft for rotation therewith, a spiral member arranged on the countershaft for rotation therewith, a gear slidably mounted on the spiral member and adapted for rotation therewith, said last mentioned gear meshing with the gear on the driven shaft, and cooperating means between the slidable gear and the cam wheel for actuating the latter automatically.

6. In combination, a drive shaft, a driven shaft, a counter shaft, a series of speed changing gears secured on the drive shaft for rotation therewith, idling gears mounted on the counter shaft and meshing with respective gears on the drive shaft, slidable clutches splined on the counter shaft for cooperation with the respective idling gears, a yoke operatively associated with each clutch, a series of levers operatively connected at their forward ends with the respective yokes, a rotatable cam wheel, cooperating means between the rear ends of the levers and said cam wheel for selectively actuating the clutches to selectively lock the idling gears on the counter shaft, and load responsive means associated with the driven shaft and the counter shaft for actuating the cam wheel depending upon the load placed on the driven shaft, said last mentioned means including a gear secured on the driven shaft for rotation therewith, a spiral member arranged on the countershaft for rotation therewith, a gear slidably mounted on the spiral member and adapted for rotation therewith, said last mentioned gear meshing with the gear on the driven shaft, and cooperating means between the slidable gear and the cam wheel for actuating the latter automatically, said last mentioned means comprising a collar on one end of the slidable gear, circumferential ribs formed on the outer peripheral face of the collar, a transverse shaft arranged below the ribbed collar, the cam wheel being secured on one end of the transverse shaft, and a spur gear secured on said transverse shaft and meshing with the circumferential ribs on said collar.

7. In combination, a drive shaft, a driven shaft, a counter shaft, speed changing gears arranged on the drive shaft for rotation therewith, idling gears mounted on the counter shaft for meshing engagement with the respective speed change gears, means for selectively keying the idling gears on the counter shaft for rotation therewith, an operator for said last mentioned means, a load responsive means for association with the driven shaft and the counter shaft for actuating said operator depending upon the load placed on the driven shaft, said load responsive means including a gear secured on the driven shaft for rotation therewith, a spiral member arranged on the counter shaft for rotation therewith, a gear slidably mounted on the spiral member and rotating therewith, and meshing with the gear on the driven shaft, cooperating means between the slidable gear and said operator to actuate the latter automatically, means for maintaining the slidable gear in a predetermined position on the spiral member, said last mentioned means comprising a pair of expansible coil springs disposed on opposite sides of the slidable gear.

8. In combination, a drive shaft, a driven shaft, a counter shaft, speed changing gears arranged on the drive shaft for rotation therewith, idling gears mounted on the counter shaft for meshing engagement with the respective speed change gears, means for selectively keying the idling gears on the counter shaft for rotation therewith, an operator for said last mentioned means, a load responsive means for association with the driven shaft and the counter shaft for actuating said operator depending upon the load placed on the driven shaft, said load responsive means including a gear secured on the driven shaft for rotation therewith, a spiral member arranged on the counter shaft for rotation therewith, a gear slidably mountd on the spiral member and rotating therewith, and meshing with the gear on the driven shaft, cooperating means between the slidable gear and said operator to actuate the latter automatically, means for maintaining the slidable gear in a predetermined position on the spiral member, said last mentioned means comprising a pair of expansible coil springs disposed on opposite sides of the slidable gear, and means for adjusting the tension of the coil spring, said last mentioned means comprising a pair of adjustable units arranged on the counter shaft on opposite sides of the slidable gear for engagement with the outer ends of the respective coil springs, each of said adjustable units comprising a ring, an internally threaded flange formed on the outer face of the ring adjacent the peripheral edge thereof, an externally threaded collar threaded on said flange, and means for moving the flanged ring toward or away from the collar.

9. In combination, a drive shaft, a driven shaft, a counter shaft, speed changing gears arranged on the drive shaft for rotation therewith, idling gears mounted on the counter shaft for meshing engagement with the respective speed change gears, means for selectively keying the idling gears on the counter shaft for rotation therewith, an operator for said last mentioned means, a load responsive means for association with the driven shaft, and the counter shaft for actuating said operator depending upon the load placed on the driven shaft, said load responsive means including a gear secured on the driven shaft for rotation therewith, a spiral member arranged on the counter shaft for rotation therewith, a gear slidably mounted on the spiral member and rotating therewith, and meshing with the gear on the driven shaft, cooperating means between the slidable gear and said operator to actuate the latter automatically, means for maintaining the slidable gear in a predetermined position on the spiral member, said last mentioned means comprising a pair of expansible coil springs disposed on opposite sides of the slidable gear, and means for adjusting the tension of the coil spring, said last mentioned means comprising a pair of adjustable units arranged on the counter shaft on opposite sides of the slidable gear for engagement with the outer ends of the respective coil springs, each of said adjustable units comprising a ring, an internally threaded flange formed on the outer face of the ring adjacent the peripheral edge thereof, an externally threaded collar threaded on said flange, and means for moving the flanged ring toward or away from the collar, said means comprising a worm gear formed on the collar at its outer end, a ring lock on the counter shaft, a pair of spaced lugs formed on the ring and projecting beyond the inner face thereof, and a worm extending through said lugs for engagement with the worm gear on the collar.

10. In combination, a drive shaft, a driven shaft, a counter shaft, a series of speed changing gears arranged on the drive shaft for rotation therewith, a series of cooperating gears idly mounted on the counter shaft, means for selectively keying the idle gears on the counter shaft, an operating mechanism for said keying means, load responsive means for association with the driven and counter shafts respectively, comprising a gear secured on the driven shaft for rotation therewith, a spiral member carried by the counter shaft for rotation therewith, a gear slidably cooperating with the spiral member for rotation with the counter shaft and meshing with the gear on the driven shaft, and cooperating means between the slidable gear of the load responsive means, and said aforementioned operating mechanism whereby the latter will be actuated automatically depending upon the load placed upon the driven shaft.

11. In combination, a drive shaft, a driven shaft, a counter shaft, a series of speed changing gears arranged on the drive shaft for rotation therewith, a series of cooperating gears idly mounted on the counter shaft, means for selectively keying the idle gears on the counter shaft, an operating mechanism for said keying means, load responsive means for association with the driven and counter shafts respectively, comprising a gear secured on the driven shaft for rotation therewith, a spiral member carried by the counter shaft for rotation therewith, a gear slidably cooperating with the spiral member for rotation with the counter shaft and meshing with the gear on the driven shaft, and cooperating means between the slidable gear of the load responsive means, said aforementioned operating mechanism whereby the latter will be actuated automatically depending upon the load placed upon the driven shaft, and means for maintaining the slidable gear in a predetermined position on the spiral member.

12. In combination, a drive shaft, a driven shaft, a counter shaft, a series of speed changing gears secured on the drive shaft for rotation therewith, idling gears mounted on the counter shaft and meshing with respective gears on the drive shaft, slidable clutches splined on the counter shaft for cooperation with the respective idling gears, a yoke operatively associated with each clutch, a series of levers operatively connected at their forward ends with the respective yokes, a rotatable cam wheel, cooperating means between the rear ends of the levers and said cam wheel for selectively actuating the clutches to selectively lock the idling gears on the counter shaft, and load responsive means associated with the driven shaft and the countershaft for actuating the cam wheel depending upon the load placed on the driven shaft, said last mentioned means including a gear secured on the driven shaft for rotation therewith, a spiral member arranged on the counter shaft and for rotation therewith, a gear slidably mounted on the spiral member and adapted for rotation therewith, said last mentioned gear meshing with the gear on the driven shaft, and cooperating means between the slidable gear and the cam wheel for actuating the latter automatically, and means for normally maintaining the slidable gear in a predetermined position on the spiral member.

13. In a device of the class described, driving and driven shafts, variable gear ratio changing mechanism between the driving and driven shafts, means operable by the driving torque of said driving shaft for automatically determining the gear ratio between said shafts, and means operable by the driving torque of said normally driven shaft for automatically determining the gear ratio between said shafts.

14. In a device of the class described, driving and driven shafts, variable gear ratio changing mechanism between the driving and driven shafts, yielding means operable by the driving torque of said driving shaft for automatically selecting the gear ratio between said shafts in accordance with the torque thereon, and means operable by the driving torque of said normally driven shaft for utilizing said yielding means for automatically selecting the gear ratio between said shafts when said normally driven shaft is rotated faster than said driving shaft.

In testimony whereof we affix our signatures.

ARTHUR J. HANTSCHEL.
JOHN E. HANTSCHEL.